Jan. 29, 1963        C. MOLINA        3,076,088
METHOD AND DEVICE FOR COOLING WELDING APPARATUS
Filed Feb. 3, 1960
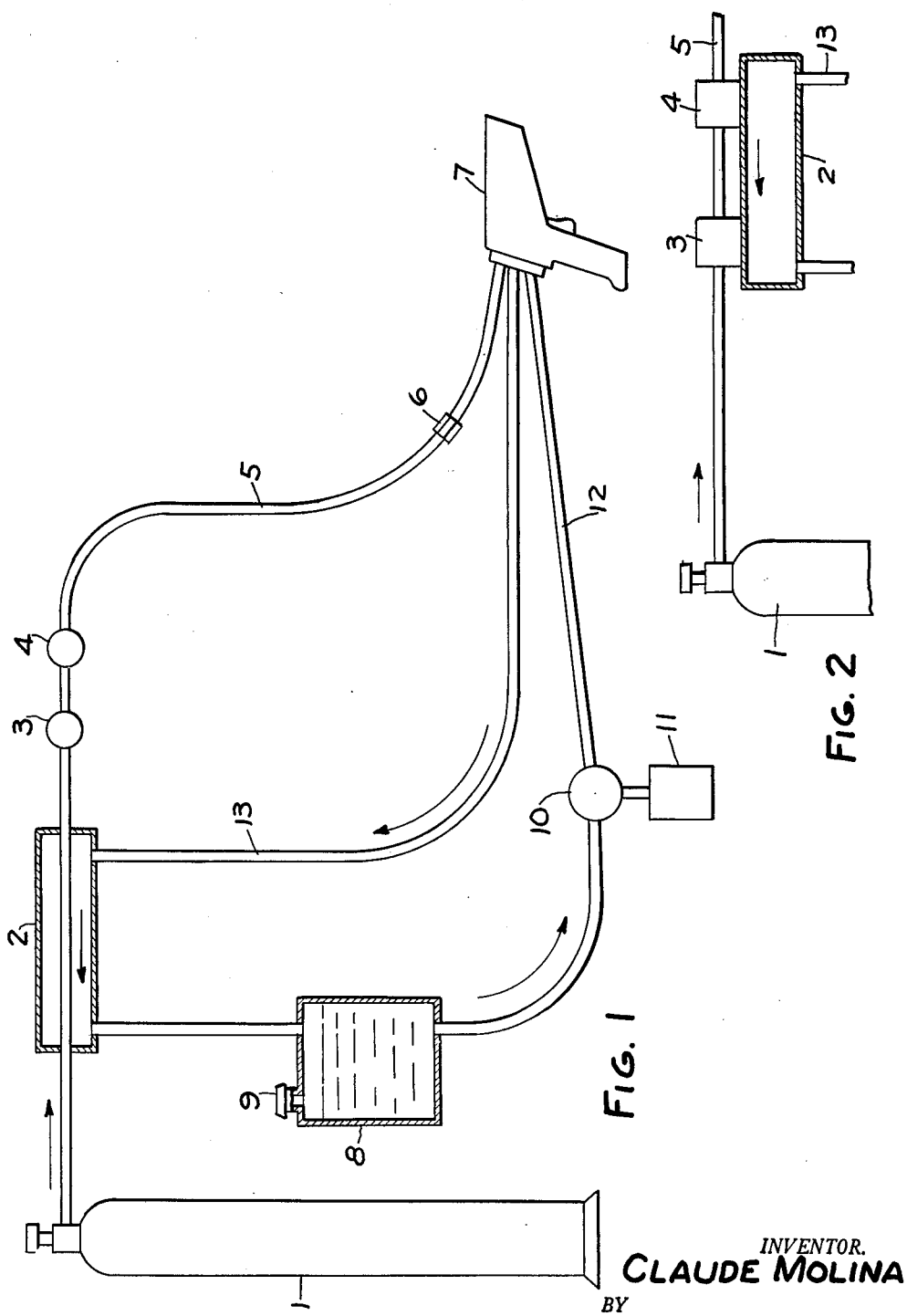
INVENTOR.
CLAUDE MOLINA
BY
ATTORNEYS

United States Patent Office 3,076,088
Patented Jan. 29, 1963

1

3,076,088
METHOD AND DEVICE FOR COOLING
WELDING APPARATUS
Claude Molina, Paris, France, assignor to Societe Anonyme Sarazin & Cie, Neuilly-sur-Seine, France, a corporation of France
Filed Feb. 3, 1960, Ser. No. 6,534
Claims priority, application France Feb. 5, 1959
8 Claims. (Cl. 219—130)

It is known that certain arc welding sets necessitate cooling of those of their members which either carry heavy currents or are heated by the radiation of the electric arc and/or the part to be welded.

These members are, for example, the nozzles mounted on automatic arc-welding heads and the nozzles fitted on semi-automatic arc-welding hand-tools as well as the wire-guide tubes which form part of said nozzles.

As a rule, these nozzles are cooled by a circulation of liquid, usually water, which passes into fluid-tight chambers made of good heat-conducting metal, these latter being in contact with the parts which overheat.

The liquid generally circulates under pressure and is evacuated after it has served its purpose. The liquid is thus wasted and furthermore, the parts which are immersed in the flow of liquid are subject to the danger of scale-formation.

When it is necessary to make the apparatus independent of the distribution circuit of the cooling fluid, for example in the case of work on a construction site, a known method is to employ the combination of a tank of sufficient capacity and containing the cooling liquid, and a pump causing the cooling liquid to circulate in a closed circuit. The disadvantage of this system resides in the fact that the capacity of the tank should be such that the liquid has the time to cool before being recycled: the tank is therefore heavy and cumbersome, thereby constituting a serious defect in the case of an autonomous apparatus.

It does also happen that, for the purpose of protecting the arc, a gas is employed such as, for example, carbon dioxide gas, which absorbs heat when expanding. It can even happen that the low temperatures produced result in frosting of certain members such as the relief-valve and the flow-meter with the subsequent result that they cease to operate.

The present invention relates to an effective cooling method only requiring a single device, relatively compact, and applicable in all cases in which the protection of the arc is ensured by the use of a gas which meets the following conditions:

(1) This gas is stored in cylinders or containers either in the gaseous state under pressure, in the liquid state or in the solid state.

(2) This gas absorbs heat when expanding.

The method in accordance with the present invention is essentially characterized in that the absorption of heat caused by the expansion of the gas employed to shield the arc is profitably employed to lower the temperature of the cooling liquid which circulates in a closed circuit.

A further object of the present invention relates to a device designed to give practical effect to the above method.

Other features will be brought out in the description which follows below with reference to two embodiments of the device in accordance with the invention, reference being made to the accompanying drawing in which FIG. 1 is a diagrammatic view of one form of device of the present invention, and FIG. 2 is a fragmentary view of a modified form of device in accordance with the present invention.

Referring to FIG. 1, the cylinder 1 of gas is coupled to an exchanger chamber 2 with double walls to which are coupled a relief-valve 3 and a flow-meter 4. A flexible or rigid conduit 5 leads the gas employed for shielding the weld up to the welding apparatus, which is shown in this case in the form of a semi-automatic welding gun. An electro-valve 6 makes it possible to control the opening or closing of the gas circuit by any suitable means. The cooling liquid, which is contained in the reservoir or collector-tank 8 provided with a filling orifice 9, is forced by the pump 10 in turn driven by the motor 11, into the circuit which is composed of the flexible or rigid piping 12, the chambers which surround the parts to be cooled of the apparatus 7, the flexible or rigid piping 13 and the exchanger chamber 2.

It is of course understood that the direction of flow of the liquid with respect to the direction of flow of the gas in the exchanger chamber 2 may be the reverse of that shown in the drawing.

The operation of the device in accordance with the present invention is very simple: the liquid contained in the tank 8 is conveyed by the action of the pump 10 into the piping 12 and from there into the cooling chambers not shown in the drawing, which surround the parts to be cooled of the apparatus 7. After playing its part of cooling agent, the liquid then arrives through the conduit 13 into the exchanger chamber 2, in which the heat which has just been absorbed by said liquid is restored to the protection gas which is thus pre-heated and no longer causes the relief-valve 3 and the flow-meter 4 to become frosted.

Experiments carried out by the present applicant have shown that it was possible to simplify the device by employing, not the principle of heat-exchange by conductivity-convection, but simply conductivity alone. In point of fact, relief-valves and flow-meters are often made of a good heat-conducting metal. By arranging against the metal of these parts a chamber in which the cooling liquid of the welding apparatus passes, it is found that the heat exchanges by conductivity between the unit comprised by the relief-valve and flow-meter combined and the chamber are sufficiently great to ensure that on the one hand, the liquid is suitably cooled and can be recycled and that on the other hand, the gas is sufficiently heated to ensure that frosting no longer takes place. This arrangement is illustrated in FIG. 2 where the valves 3 and 4 are shown located in heat conducting relation with chamber 2.

With a welding apparatus employing a welding current of 450 amps, it has been possible to weld for a number of hours, at the very high working factor of 80% without causing the welding apparatus to over-heat and without causing the relief-valve and the flow-meter to be affected by frosting. During this test, the temperature of the cooling liquid did not exceed 60° C., the volume of this liquid which in this case was water, being only three litres. The weight of the complete assembly constituted by the tank, the circulation pump, the motor, the exchange chamber and the cooling liquid, was less than ten kilograms.

The advantages of the method and of the device in accordance with the present invention are numerous and manifest:

By operating in a closed circuit, the apparatus provided its own supply of cooling liquid, thereby avoiding any waste of liquid on the one hand and rendering the apparatus completely autonomous on the other.

In addition to this, the liquid plays at the same time the part of cooling agent and heating agent, thus making it possible to economize the energy necessary for reheating the protection gas and to reduce the weight and bulk of the complete welding apparatus.

Finally, by reason of the small quantity of cooling liquid employed, the device in accordance with the present invention makes it possible to employ a liquid which is chemically pure. Thus in the case of cooling by means of water, the use of distilled water avoids the formation of scale on the piping and on those parts of the welding apparatus which are immersed in the flow of water.

What I claim is:

1. In the method of arc welding wherein a gas from a source under pressure is directed through an expansion valve to reduce the pressure thereof and the expanded gas is directed to and discharged from an arc welding head to shield the arc and wherein the arc welding head is maintained at a desired low temperature by conducting a cooling liquid in heat exchange relation thereto, that improvement which comprises utilizing the heat transferred to the cooling liquid by said head to raise the temperature of the gas traversing the expansion valve.

2. The method called for in claim 1 wherein the cooling liquid is brought into heat exchange relation with the gas after the cooling liquid is conducted in heat exchange relation with the head.

3. In the method of electric arc welding wherein a gas from a source under pressure is permitted to expand to reduce the pressure thereof and is then directed to an arc welding head and discharged therefrom to shield the arc and a cooling liquid is conducted through the head to maintain the parts thereof which are otherwise apt to become overheated at a desired low temperature, that improvement which comprises conducting the cooling liquid after it has been heated by said head in heat exchange relation with said gas to pre-heat the gas before the gas is conducted to the arc welding head.

4. The method called for in claim 3 wherein said cooling liquid is conducted in heat exchange relation with the expanding gas.

5. In an arc welding apparatus of the type which includes a source of gas under pressure, conduit means extending from said source to an arc welding head from which the gas is discharged to shield the arc, a valve in said conduit means for reducing the pressure of said gas prior to its discharge at said head and a re-circulating cooling liquid system in heat exchange relation with said head for preventing overheating of said head, that improvement which comprises a manifold in said cooling liquid system through which the cooling liquid flows, said manifold being arranged in heat exchange relation with said conduit means on at least the upstream side thereof relative to said pressure reducing valve whereby the expanding gas is pre-heated by the cooling liquid to prevent the temperature of the pressure reducing valve from being reduced to a sufficiently low temperature by the expansion of the gas to prevent proper operation thereof.

6. The combination called for in claim 5 wherein said re-circulating cooling system includes a pump having an outlet communicating with a coolant inlet on the head and an inlet communicating with a coolant outlet on the head and the manifold is located on the discharge side of the head and on the inlet side of the pump in said re-circulating system.

7. The combination called for in claim 5 including a flow control valve in said conduit means on the discharge side of and closely adjacent the outlet of said expansion valve.

8. The combination called for in claim 7 wherein the coolant in said manifold is in heat exchange relation with said pressure reducing valve and said flow control valve.

References Cited in the file of this patent

UNITED STATES PATENTS

| | | |
|---|---|---|
| 1,716,614 | Bergman | June 11, 1929 |
| 2,827,549 | Carlson | Mar. 18, 1958 |